(12) United States Patent
Yuan et al.

(10) Patent No.: US 9,535,438 B2
(45) Date of Patent: Jan. 3, 2017

(54) FAST RESPONSE PULSE WIDTH MODULATION CONTROL FOR SWITCHING REGULATOR

(71) Applicant: SanDisk Technologies Inc., Plano, TX (US)

(72) Inventors: Henry H. Yuan, San Ramon, CA (US); Steve X. Chi, Cupertino, CA (US); Ekram H. Bhuiyan, San Jose, CA (US)

(73) Assignee: SanDisk Technologies LLC, Plano, TX (US)

( * ) Notice: Subject to any disclaimer, the term of this patent is extended or adjusted under 35 U.S.C. 154(b) by 176 days.

(21) Appl. No.: 14/328,368

(22) Filed: Jul. 10, 2014

(65) Prior Publication Data

US 2016/0011611 A1  Jan. 14, 2016

(51) Int. Cl.

| G05F 1/08 | (2006.01) |
|---|---|
| G05F 1/575 | (2006.01) |
| G05F 1/46 | (2006.01) |
| H02M 3/156 | (2006.01) |
| H02M 1/00 | (2006.01) |

(52) U.S. Cl.
CPC ............... G05F 1/575 (2013.01); G05F 1/46 (2013.01); H02M 3/156 (2013.01); *H02M 2001/0025* (2013.01)

(58) Field of Classification Search
CPC .............. G05F 1/08; G05F 1/575; G05F 1/46; H02M 3/156; H02M 2001/0025
USPC ........................................ 323/271–289, 351
See application file for complete search history.

(56) References Cited

U.S. PATENT DOCUMENTS

| 4,929,882 A * | 5/1990 | Szepesi ................. H02M 3/156 323/222 |
|---|---|---|
| 7,456,621 B2 * | 11/2008 | Leung ..................... H02M 1/42 323/283 |
| 2007/0052398 A1 * | 3/2007 | Hasegawa ........... H02M 3/1584 323/282 |
| 2009/0164807 A1 * | 6/2009 | Chi .......................... G06F 1/26 713/300 |
| 2011/0187342 A1 * | 8/2011 | Yuan ......................... G05F 1/10 323/288 |
| 2012/0119720 A1 * | 5/2012 | Li .......................... H02M 3/158 323/284 |
| 2013/0187624 A1 | 7/2013 | Wakasugi |
| 2014/0266110 A1 * | 9/2014 | Yuan .................... H02M 3/156 323/282 |

(Continued)

OTHER PUBLICATIONS

ISR PCT/US2015/032752 dated Sep. 2, 2015, 2 pages.

*Primary Examiner* — Adolf Berhane
*Assistant Examiner* — Nusrat Quddus
(74) *Attorney, Agent, or Firm* — Martine Penilla Group, LLP

(57) ABSTRACT

A switching rectifier circuit includes a pulse width modulation controller, a voltage switching circuit, a pulse width modulation comparator, an error amplifier, a voltage reference, a high threshold voltage comparator and a low threshold voltage comparator. A varying output voltage of the voltage regulator is sampled and compared to a high threshold voltage reference and a low threshold voltage reference. When the sampled output voltage is equal to or greater than the high threshold voltage reference the output voltage is decreased. When the sampled output voltage is equal to or less than the low threshold voltage reference the output voltage is increased.

20 Claims, 10 Drawing Sheets

(56) References Cited

U.S. PATENT DOCUMENTS

2014/0266397 A1\* 9/2014 Yuan ........................ H03K 4/02
327/401

\* cited by examiner

FAST RESPONSE PULSE WIDTH MODULATION CONTROL FOR SWITCHING REGULATOR

BACKGROUND

The present invention relates generally to switching voltage regulators, and more particularly, to methods and systems for pulse width modulated switching voltage regulators.

Voltage regulators perform the important function of providing a constant voltage level. The voltage level can then be used as a reference or for powering devices in a repeatable, reliable manner of operation. By way of example, a regulated 5 volts DC can be used as a logical 1 reference value with a ground or 0 volts DC being a logical 0 reference. Similarly, a regulated 5 volts DC can be used to cause a transistor to switch at a repeatable switching speed. Increasing the voltage to greater than 5 volts DC may decrease the time required for the transistor to switch (e.g., increase the switching speed) but may also damage the transistor. Decreasing the voltage to less than 5 volts DC may increase the time required for the transistor to switch (e.g., decrease the switching speed) or prevent the transistor from switching at all. Further, a voltage less than 5 volts DC may or may not be sufficient to be detected as a logical 1 reference and instead may be erroneously interpreted as a logical 0.

As semiconductor device (e.g., transistors, transistor gates and channels, capacitors, resistors, line widths, etc.) sizes have decreased, the operating voltages have also decreased. As a result, the operating voltages have been reduced from 5 volts to a low are 3.3 volts and even 1.1 volts DC. As the operating voltage has been reduced, the operating voltage regulation requirements have become ever more strict. As a result, the regulated operating voltage must be maintained within a narrower voltage tolerance.

Linear regulator circuits are relatively power inefficient as compared to a typical pulse width modulated switching regulator circuit. Increased power efficiency is also a constant demand corresponding with shrinking semiconductor device sizes.

Unfortunately, typical pulse width modulated switching regulator circuits can allow the regulated voltage output to dip or rise outside an acceptable output voltage range between modulation pulses. The undesirable output voltage dips or rises are typically due to transient circuit loads having a frequency greater than the pulse width modulating frequency. The undesirable output voltage dips or rises can cause data errors and can result in inconsistent circuit operations of the circuits driven by the output voltage. There is a need for an improved pulse width modulated switching regulator circuit that compensates for higher frequency transient loads without substantially affecting the power efficiency of the pulse width modulated switching regulator circuit.

SUMMARY

Broadly speaking, the present invention fills these needs by providing a pulse width modulated switching regulator circuit that effectively and efficiently compensates for transient loads having a frequency greater than the pulse modulation frequency. It should be appreciated that the present invention can be implemented in numerous ways, including as a process, an apparatus, a system, computer readable media, or a device. Several inventive embodiments of the present invention are described below.

One implementation provides a switching rectifier circuit including a voltage input coupled to a positive amplification device and a negative amplification device. The positive amplification device and the negative amplification device coupled in series. The switching rectifier circuit also includes a voltage output node on a common output of the positive amplification device and the negative amplification device and a pulse width modulation controller coupled to the positive amplification device and the negative amplification device, the pulse width modulation controller including a set input and a reset input. A voltage switching circuit having a voltage switching circuit output and a clock signal input and a pulse width modulation comparator coupled between the voltage switching circuit output and the pulse width modulation controller are also included. An error amplifier has an error amplifier output coupled to the pulse width modulation comparator. A voltage reference is coupled to the error amplifier. The switching rectifier circuit also includes a high threshold voltage comparator and a low threshold voltage comparator. The high threshold voltage comparator includes a high threshold voltage reference coupled to a first high threshold voltage comparator input, a second high threshold voltage comparator input coupled to the output voltage and a high threshold voltage comparator output coupled to the pulse width modulation controller reset input. The low threshold voltage comparator includes a low threshold voltage reference coupled to a first low threshold voltage comparator input, a second low threshold voltage comparator input coupled to the output voltage and a low threshold voltage comparator output coupled to the pulse width modulation controller set input.

The high threshold voltage comparator can also include an immediate reset pulse generator having an immediate reset pulse generator input coupled to an output of a comparison of the high threshold voltage reference and the feedback voltage divider output. The low threshold voltage comparator can include an immediate set pulse generator having an immediate set pulse generator input coupled to an output of a comparison of the low threshold voltage reference and the feedback voltage divider output.

The switching rectifier circuit can also includes a current switching circuit, a summation circuit coupled between the voltage switching circuit output and the pulse width modulation comparator. The summation circuit including a first summation circuit input coupled to the voltage switching circuit output and a second summation circuit input coupled to the current switching circuit. The summation circuit can also include an increase pulse width modulation ramp input coupled to a comparison of the high threshold voltage reference and the feedback voltage divider output. The summation circuit can also include a decrease pulse width modulation ramp input coupled to a comparison of the low threshold voltage reference and the feedback voltage divider output.

The pulse width modulation controller can include a first pulse width modulation controller output coupled to the positive amplification device, a second pulse width modulation controller output coupled to the negative amplification device and a pulse width modulation controller input. The pulse width modulation comparator can include a first pulse width modulation comparator input, wherein the first pulse width modulation comparator input is coupled to the voltage switching circuit output, a second pulse width modulation comparator input and a pulse width modulation comparator output.

The error amplifier can include a first error amplifier input, a second error amplifier input and an error amplifier output coupled to pulse width modulation comparator. The switching rectifier circuit can also include a feedback voltage divider including a feedback voltage divider input coupled to the voltage output node and a feedback voltage divider output coupled to the error amplifier.

Another implementation provides a method of regulating a voltage including sampling a varying output voltage of a voltage regulator, comparing the sampled output voltage to a high threshold voltage reference, decreasing the output voltage of the voltage regulator when the sampled output voltage is equal to or greater than the high threshold voltage reference, increasing the output voltage of the voltage regulator when the sampled output voltage is equal to or less than the low threshold voltage reference. Sampling the output voltage can include dividing the output voltage in a feedback voltage divider.

Decreasing the output voltage can include increasing a pulse width modulating ramp signal. Decreasing the output voltage can include decreasing a duty cycle of the voltage regulator.

Increasing the output voltage can include decreasing a pulse width modulating ramp signal. Increasing the output voltage can include increasing a duty cycle of the voltage regulator.

The voltage regulator can be a switching voltage regulator. Varying the output voltage of the voltage regulator can include varying a load coupled to the output of the voltage regulator. Sampling the varying output voltage of the voltage regulator can include coupling the output voltage of the voltage regulator through a feedback voltage divider.

Yet another implementation provides a method of regulating a voltage including sampling a varying output voltage of a voltage regulator, comparing the sampled output voltage to a high threshold voltage reference, decreasing the output voltage of the voltage regulator and decreasing a duty cycle of the voltage regulator when the sampled output voltage is equal to or greater than the high threshold voltage reference, and increasing the output voltage of the voltage regulator and increasing the duty cycle of the voltage regulator when the sampled output voltage is equal to or less than the low threshold voltage reference.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for a system, method and apparatus for a pulse width modulated switching regulator circuit that effectively and efficiently compensates for transient loads having a frequency greater than the pulse modulation frequency will now be described. It will be apparent to those skilled in the art that the present invention may be practiced without some or all of the specific details set forth herein.

An output voltage feedback signal can be used to adjust the output voltage on an as needed basis. By way of example, when the feedback signal is lower than a low threshold level, an immediate set signal and reduce ramp signal to increase duty cycle can be immediately issued for at least one cycle until the feedback signal becomes higher than the low threshold level. Similarly, when the feedback signal is higher than a high threshold level an immediate reset signal and an increase ramp signal to decrease duty cycle can be immediately issued for at least one cycle until the feedback becomes lower than the high threshold level. The immediately issued set and reset signal and ramp signal determine the pulse width modulation duty cycle for better output response. A regularly scheduled set signal that is synchronized with switching clock and the regularly scheduled reset signal is generated by a pulse width modulation controller. The immediately set signal, immediately reset signal and ramp signal changes provide very timely response to transient voltage spikes or drops, therefore improving the regulation operation.

The disclosed system improves transient response on pulse width modulated controls caused by the limitations of switching frequency and error amplifier bandwidth in a typical switching regulator circuit. In a typical, switching regulator, the duty cycle is determined by regularly scheduled set and reset signals. The pulse width modulation controller issues the set signal only once during each switching cycle. The switching cycle has a predetermined frequency. Any transient voltage drops or voltage spikes that occur between the regularly scheduled set and reset signals will not be addressed until at least the next regularly scheduled set or reset signal. As a result, transient voltage drops or voltage spikes having a frequency greater than the typical switching regulator's switching frequency will be missed by the typical switching regulator.

Figure 1:
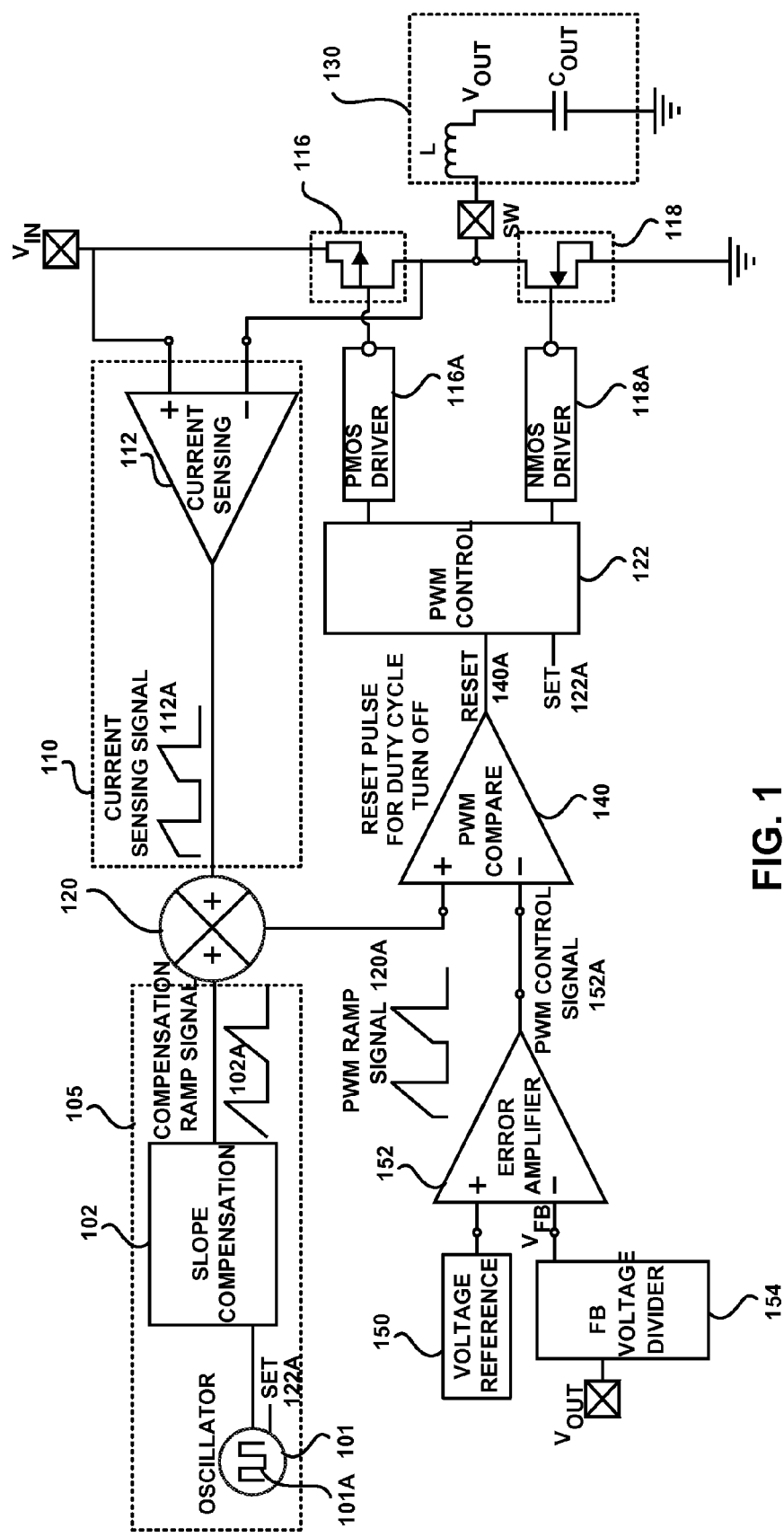
FIG. 1 is a simplified schematic of a typical switching regulator circuit.

FIG. 1 is a simplified schematic of a typical switching regulator circuit 100. The typical switching regulator circuit 100 includes a PMOS device 116 and an NMOS device 118 for amplifying the respective positive and negative portions of a voltage input signal Vin input to the Vin node. The PMOS device 116 and the NMOS device 118 are driven by respective PMOS driver 116A and NMOS driver 118A. The PMOS driver 116A and NMOS driver 118A provide a driving current/voltage to the respective PMOS driver 116A and NMOS driver 118A according to a pulse width modulation controller 122. The PMOS device 116 and the NMOS device 118 are coupled to an output node 114. It should be understood that while a PMOS device 116 and an NMOS device 118 are discussed here, these are exemplary implementations and other suitable positive and negative amplification devices and circuits could be used instead of or in addition to the PMOS device 116 and an NMOS device 118 for implementing embodiments of the present disclosure.

The typical switching regulator circuit 100 includes filter network 130 including a capacitor Cout and an inductor L. Additional circuit devices can also be included in the filter network. Additional devices can include additional inductors, additional capacitors, one or more resistors each of which and combinations of which can be connected in series and parallel configurations.

The typical switching regulator circuit 100 includes a voltage switching circuit 105. In the voltage switching circuit 105, an oscillator 101 provides clock signal 101A at a selected switching frequency. The clock signal 101A is input to a slope compensation circuit 102 which produces a voltage compensation ramp signal 102A at the selected switching frequency.

The typical switching regulator circuit 100 can also include an optional, current switching circuit 110. The current switching circuit 110 monitors the output current of the typical switching regulator circuit 100. The current switching circuit 110 includes a current sensing circuit 112 that produces a current sensing signal 112A. The current sensing circuit 112 is coupled to the voltage input Vin node and the output node 114.

The voltage compensation ramp signal 102A and the current sensing signal 112A are input to a summation circuit 120 that combines the voltage compensation ramp signal 102A and the current sensing signal 112A to produce a pulse width modulation ramp signal 120A. The pulse width modulation ramp signal 120A is input to a pulse width modulation comparator 140.

Figure 2:
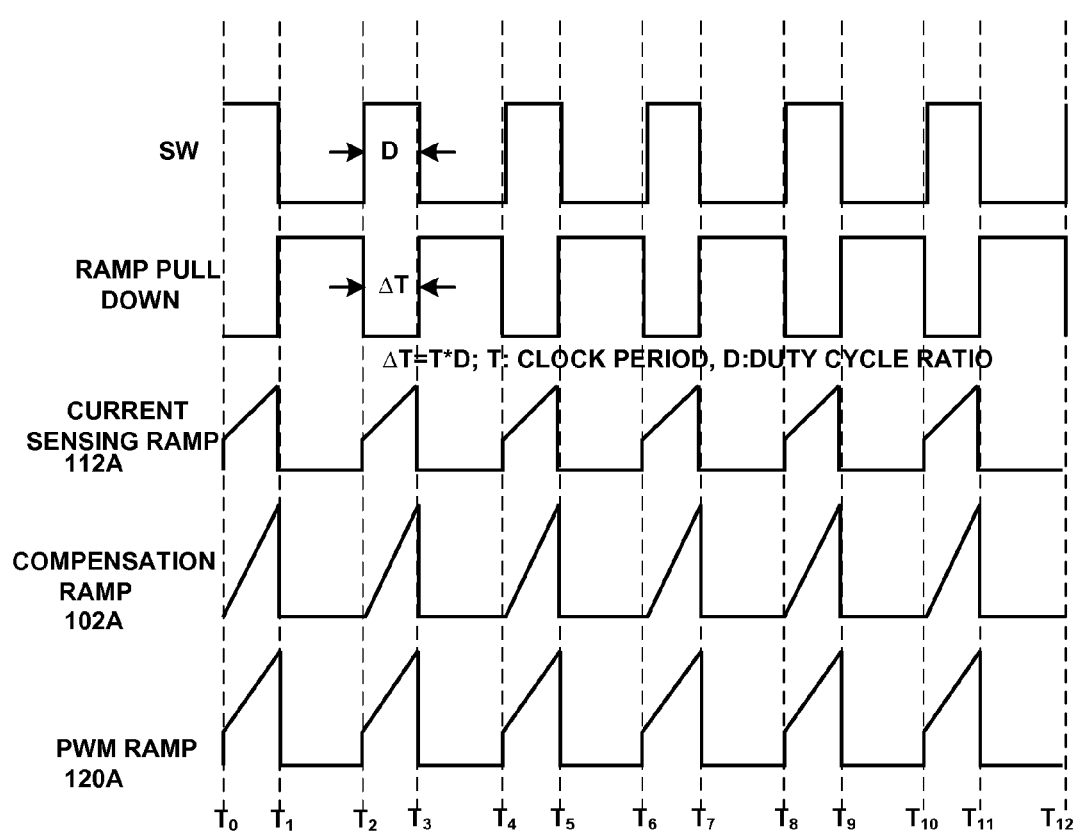
FIG. 2 shows a graph of the compensation ramp signal, the current sensing signal and the pulse width modulation ramp signal.

FIG. 2 shows a graph of the compensation ramp signal 102A, the current sensing signal 112A and the pulse width modulation ramp signal 120A. The pulse width modulation ramp signal 120A is substantially equal to a sum of the voltage compensation ramp signal 102A and the current sensing signal 112A.

Referring again to FIG. 1, a selected voltage reference 150 and a sample voltage $V_{FB}$ of the output voltage Vout are input to an error amplifier 152. The sample voltage $V_{FB}$ of the output voltage Vout can be formed from a feedback (FB) voltage divider 154. The error amplifier 152 compares the voltage reference 150 and the sample voltage $V_{FB}$ and outputs a pulse width modulation control signal 152A corresponding to the difference between the sample voltage $V_{FB}$ and the voltage reference 150. The pulse width modulation control signal 152A is input to the pulse width modulation comparator 140.

The pulse width modulation comparator 140 compares the pulse width modulation control signal 152A and the pulse width modulation ramp signal 120A. The pulse width modulation comparator 140 outputs a reset signal 140A to the pulse width modulation controller 122. The timing of the reset signal 140A being input to the pulse width modulation controller 122 determines the duty cycle D of the resulting pulse.

Figure 3:
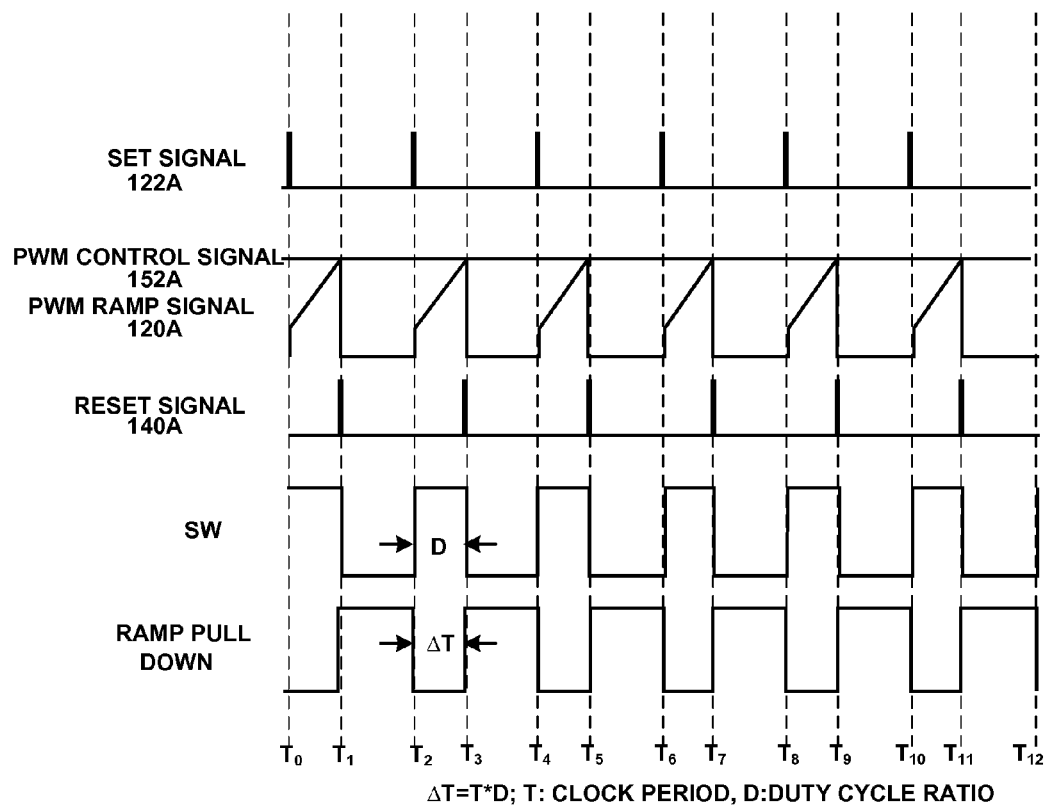
FIG. 3 shows a graph of the set signal, the pulse width modulation ramp signal, the pulse width modulation control signal and the reset signal.

FIG. 3 shows a graph of the set signal 122A, the pulse width modulation ramp signal 120A and the reset signal 140A. The set signal 122A is triggered by the clock oscillator 101 on the rising edge of the each switching cycle 101A. The reset signal 140A is triggered on the falling edge of each cycle of the pulse width modulation ramp signal 120A, if there is a difference between the voltage reference 150 and the sample voltage $V_{FB}$. The reset signal 140A is not triggered on the falling edge of each cycle of the pulse width modulation ramp signal 120A if there is no difference between the voltage reference 150 and the sample voltage $V_{FB}$.

Figure 4:
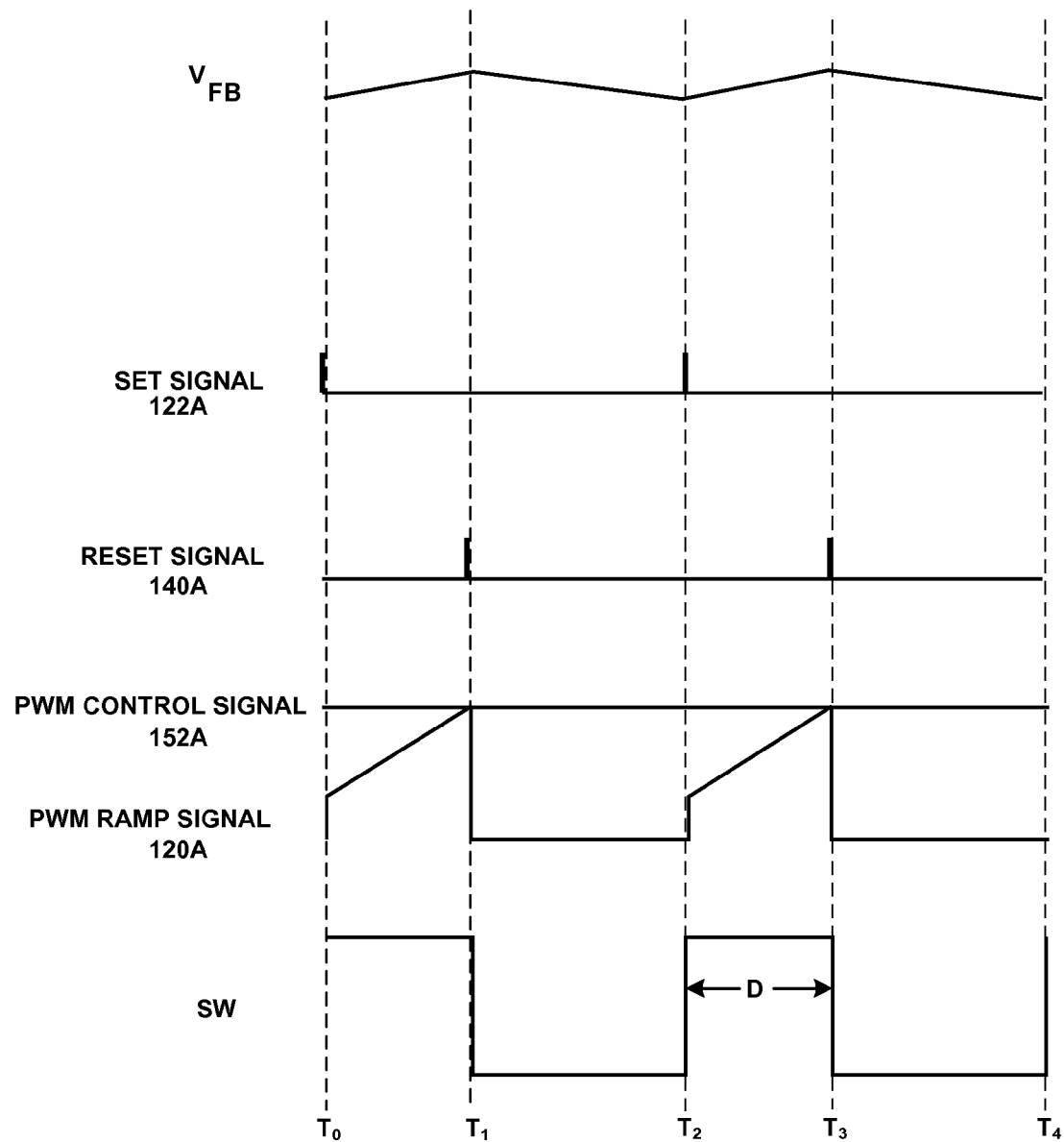
FIG. 4 shows graphs of the various signals as the typical switching regulator circuit operates.

FIG. 4 shows graphs of the various signals as the typical switching regulator circuit 100 operates. As shown in FIG. 4, the sample voltage $V_{FB}$ varies relatively small amounts between times T0 and T4. The sample voltage $V_{FB}$ variations are typically caused by small variations in load (not shown) on the output of the typical switching regulator circuit 100. Small variations of load on the output of the typical switching regulator circuit 100 is common under normal operations.

The period of the set signal 122A is determined by the frequency of the oscillator output signal 101A. Typically, between about 2 kHz and about 50 MHz. In some instances the frequency of the oscillator output signal 101A is limited to between about 1 MHz and about 5 MHz. As, used herein, the term "about" encompasses a range of +/−10 percent of the stated amount. By way of example, a range of about 1 MHz to about 5 MHz can include as broad of a range as 900 kHz to 5.5 MHz and as narrow of a range as 1.1 MHz to 4.5 MHz. In some implementations, the frequency of the oscillator output signal 101A is set to about 2 MHz. As stated above in FIG. 3, the reset signal 140A is triggered on the falling edge of each cycle of the pulse width modulation ramp signal 120A.

Figure 5:
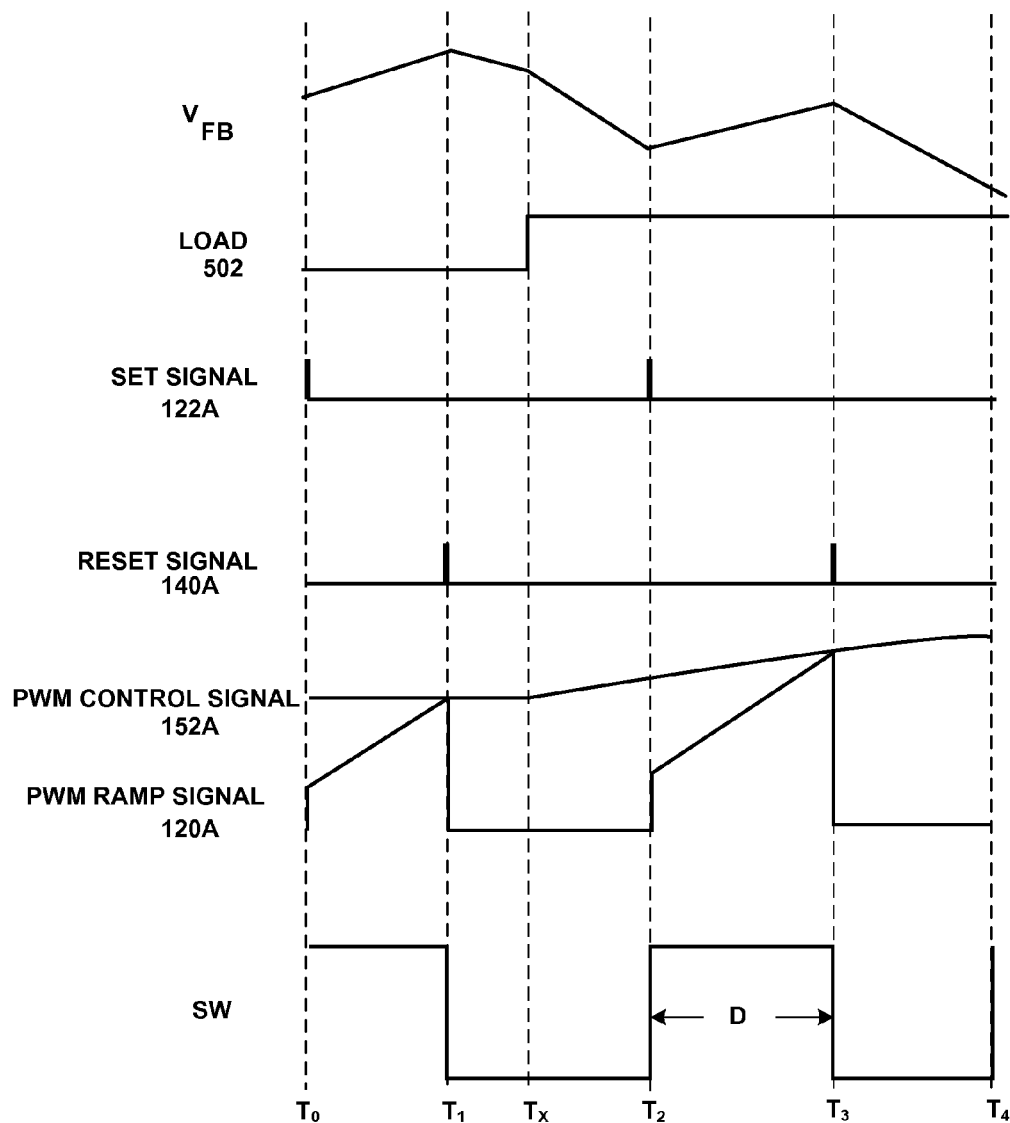
FIG. 5 shows graphs of the various signals as the typical switching regulator circuit operates when load and voltage variations occur between a reset signal and a set signal.

FIG. 5 shows graphs of the various signals as the typical switching regulator circuit 100 operates when load and voltage variations occur between a reset signal 140A and a set signal 122A. A time Tx, occurs sometime after reset trigger 140A at time T1 and before set signal 122A at time T2. At time Tx, the load 502 on the typical switching regulator circuit 100 increases and the sample voltage $V_{FB}$ is drawn lower due to the increased load. The corresponding sample voltage $V_{FB}$ is also drawn lower than the relatively minor variations shown in FIG. 4. Also at time Tx, the pulse width modulation control signal 152A begins to rise, however, the pulse width modulation compare circuit 140 is not enabled by the pulse width modulation ramp signal 120A until the time T2, when the next scheduled set signal 122A is issued.

At time T2, the set signal 122A is issued and the sample voltage $V_{FB}$ begins to climb. However, at time T3 the next scheduled reset signal 140A is issued and the typical switching voltage regulator 100 beings to drive the output voltage and the corresponding sample voltage $V_{FB}$ lower as that is the typical response to the reset signal. The sample voltage $V_{FB}$ lower continues to fall lower until the next set signal 122A. The typical switching voltage regulator 100 requires several cycles to recover from the increase in load at time Tx.

Figure 6:
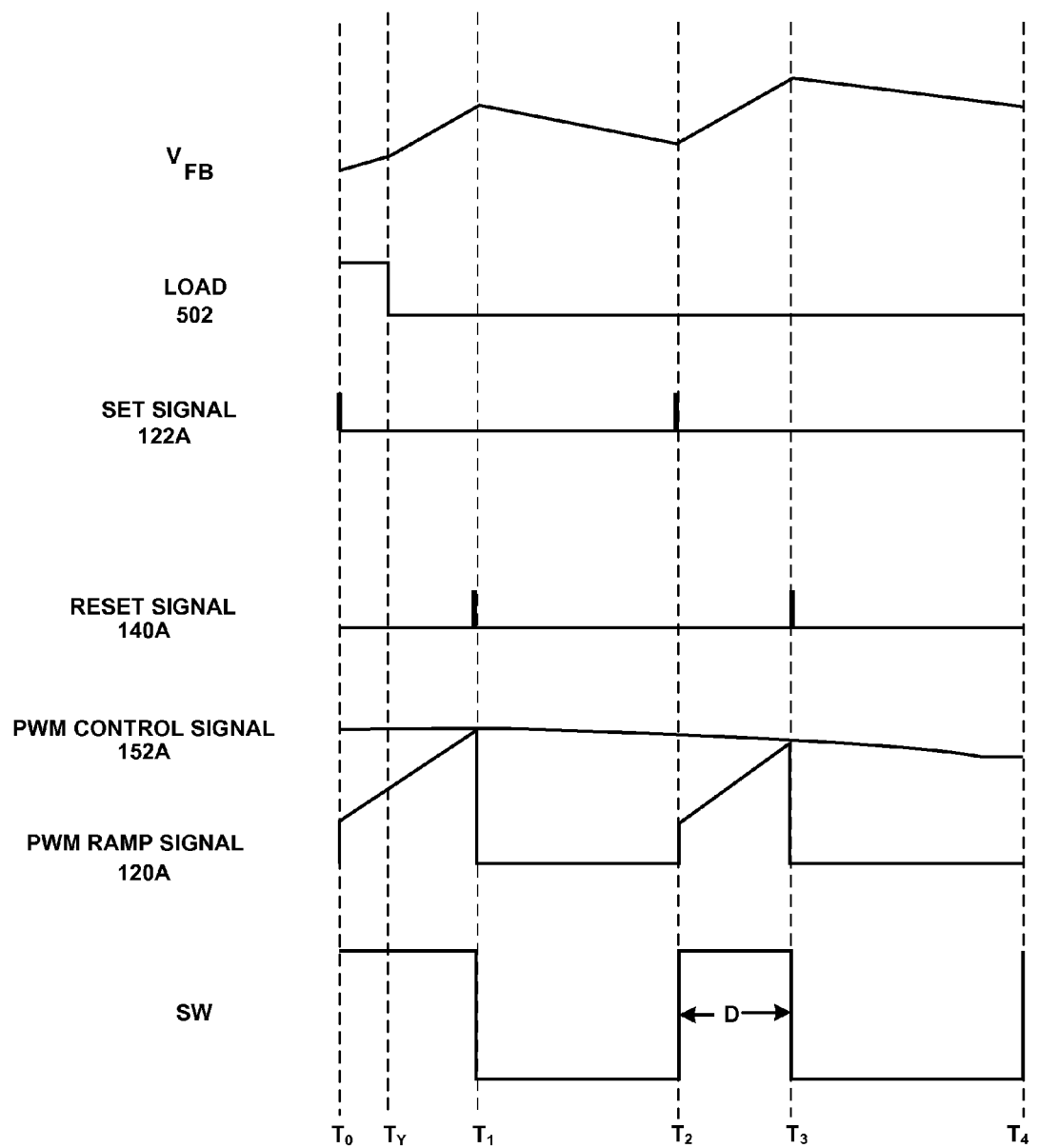
FIG. 6 shows graphs of the various signals as the typical switching regulator circuit operates when load and voltage variations occur between a reset signal and a set signal.

FIG. 6 shows graphs of the various signals as the typical switching regulator circuit 100 operates when load and voltage variations occur between a reset signal 140A and a set signal 122A. A time Ty, occurs sometime after set signal 122A at time T0 and before reset signal 140A at time T1. At time Ty, the load 502 on the typical switching regulator circuit 100 decreases and the corresponding sample voltage $V_{FB}$ is drawn higher due to the decreased load. The decreased load 502 draws the sample voltage $V_{FB}$ higher than the relatively minor variations shown in FIG. 4.

At time T1 the next scheduled reset signal 140A is issued. As a result the output voltage and the sample voltage $V_{FB}$ is drawn lower. However, at time T2, the set signal 122A is issued and the sample voltage $V_{FB}$ begins to climb. As discussed above, the switching voltage regulator 100 requires several cycles to recover from the decrease in load at time Ty. Further, the variations in the output voltage Vout can cause problems discussed above in the circuits and devices the output voltage is applied to.

Figure 7:
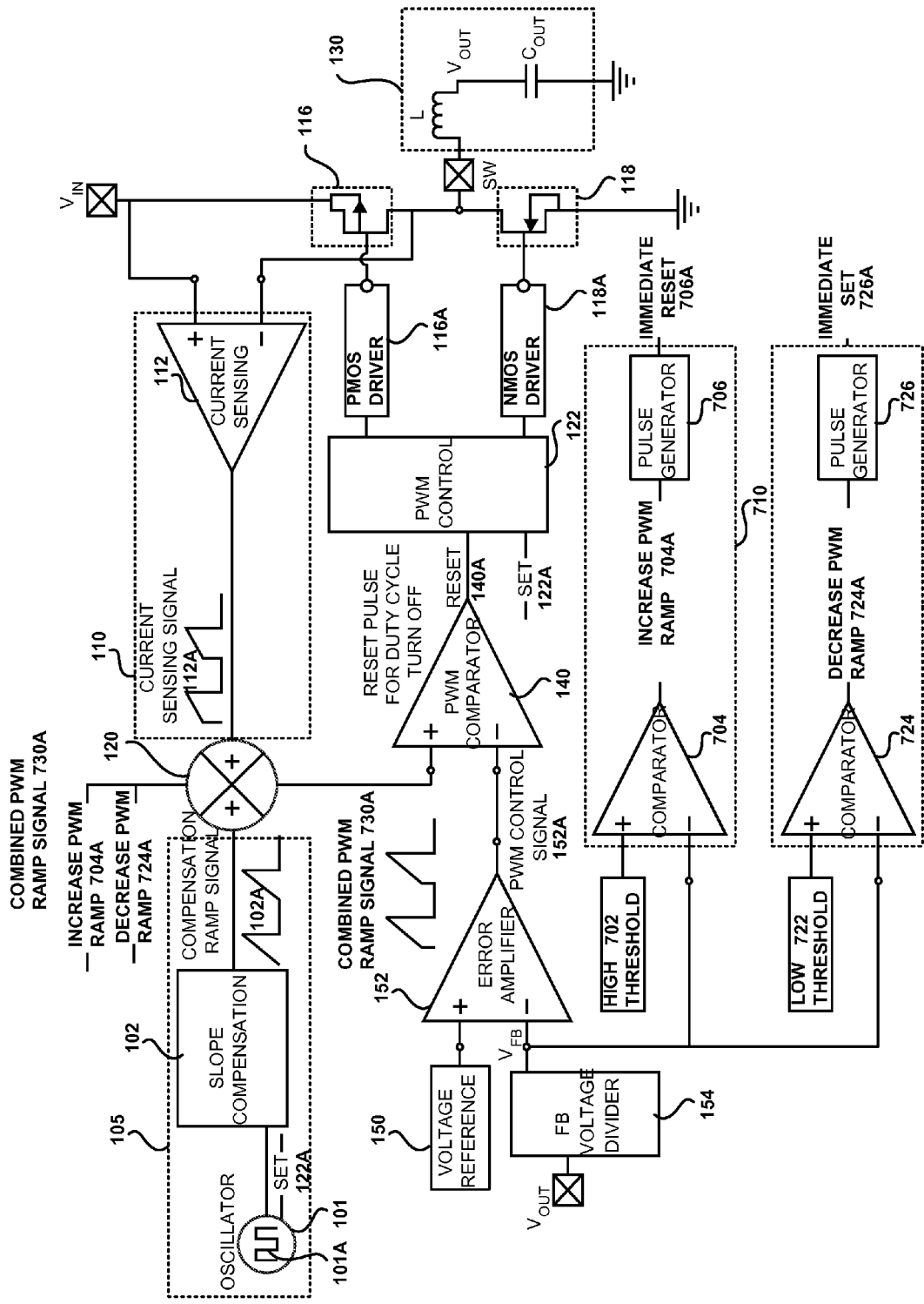
FIG. 7 is a simplified schematic of an improved switching regulator circuit, for implementing embodiments of the present disclosure.

FIG. 7 is a simplified schematic of an improved switching regulator circuit 700, for implementing embodiments of the present disclosure. The improved switching regulator circuit 700 is substantially similar to the typical switching regulator circuit 100, with additional circuit elements providing faster response pulse width modulation control. The additional circuit elements include a high threshold circuit 710 and a low threshold circuit 720. The high threshold circuit 710 immediately reacts to decrease in load 502 conditions as described in FIG. 6 above. The low threshold circuit 720 immediately reacts to increase in load 502 conditions as described in FIG. 5 above.

The high threshold circuit 710 includes a high threshold voltage comparator 704 and a pulse generator 706 for generating an immediate reset signal 706A. The immediate reset signal 706A is generated immediately when a selected high threshold reference voltage 702 is met or exceeded by the sample voltage $V_{FB}$.

The low threshold circuit 720 includes a low threshold voltage comparator 724 and a pulse generator 726 for generating an immediate set signal 726A. The immediate set signal 726A is generated immediately when a selected low threshold voltage reference 722 is met or exceeded by the sample voltage $V_{FB}$. The immediate reset signal 706A and the immediate set signal 726A captures changes in the sample voltage $V_{FB}$ having a higher frequency than the clock signal of the improved switching regulator circuit 700.

The high threshold circuit 710 can optionally also generate an increase pulse width modulation ramp signal 704A. The increase pulse width modulation ramp signal 704A can also, optionally, be input to the summation circuit 120 to modify the pulse width modulation ramp signal 120A and to form a combined pulse width modulation ramp signal 730A.

The low threshold circuit 720 can optionally also generate a decrease pulse width modulation ramp signal 724A. The decrease pulse width modulation ramp signal 724A can also, optionally, be input to the summation circuit 120 to modify the pulse width modulation ramp signal 120A and to form the combined pulse width modulation ramp signal 730A. The combined pulse width modulation ramp signal 730A modifies the output of the pulse width modulation comparator to produce a reset signal 140A having a pulse width that can more effectively address the increase or decrease in load and the corresponding increase or decrease in output voltage Vout as shown in the following FIGS. 8 and 9.

Figure 8:
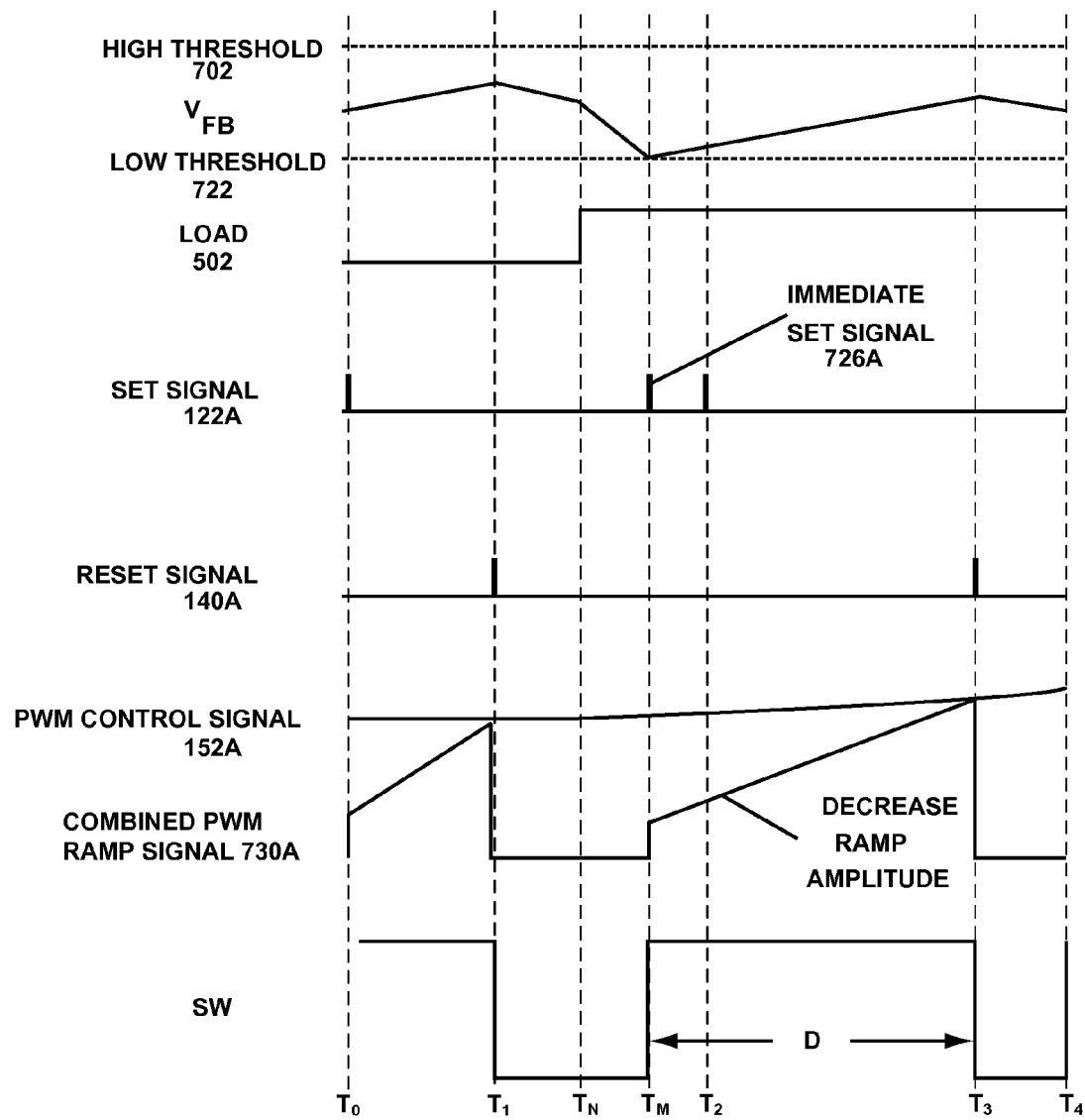
FIG. 8 shows graphs of the various signals as the improved switching regulator circuit operates when load and voltage variations occur between a reset signal and a set signal, for implementing embodiments of the present disclosure.

FIG. 8 shows graphs of the various signals as the improved switching regulator circuit 700 operates when load and voltage variations occur between a reset signal 140A and a set signal 122A, for implementing embodiments of the present disclosure. A time Tn, occurs sometime after reset signal 140A at time T1 and before set signal 122A at time T2. At time Tn, the load 502 on the improved switching regulator circuit 700 increases and the sample voltage $V_{FB}$ is drawn lower due to the increased load. The increased load 502 draws the sample voltage $V_{FB}$ lower than the relatively minor variations shown in FIG. 4 and eventually drops to a level equal to or less than a low threshold voltage level 722 at time Tm.

Also at time Tn, the pulse width modulation control signal 152A begins to rise, however, the pulse width modulation compare circuit 140 is usually not enabled by the pulse width modulation ramp signal 120A until the time T2, when the next scheduled set signal 122A is issued. The decreased ramp amplitude extends the length of duty cycle C.

Because the $V_{FB}$ fell to or below the low threshold voltage level 722, at time Tm, the low threshold comparator 720 produces a decrease pulse width modulation ramp signal 724A and triggers pulse generator 726 to generate an immediate set signal 726A. A time Tm the sample voltage $V_{FB}$ begins to climb. When the feedback signal is lower than a low threshold level, the immediate set signal and reduce ramp signal to increase duty cycle can be immediately issued for at least one cycle until the feedback signal becomes higher than the low threshold level.

At time T2, the scheduled set signal 122A is also issued, however nothing else occurs as the improved switching regulator circuit 700 has already been set to drive the output voltage higher by the immediate set signal 726A issued at time Tm.

Issuing the immediate set signal 726A at time Tm provides a longer duty cycle D before time T3 when the next scheduled reset signal 140A is issued. The increased duty cycle D between the immediate set signal 726A and the next scheduled reset signal 140A provides more time for the improved switching regulator circuit 700 to drive the output voltage Vout higher in response to the increased load 502.

At time T3 the next scheduled reset signal 140A is issued and the improved switching voltage regulator 700 beings to drive the output voltage Vout and the corresponding sample voltage $V_{FB}$ lower, however, the rate of decrease is lessened by the combination of the decreased pulse width modulation ramp signal 724A in the summation circuit 120. As a result, the improved switching voltage regulator 700 responds very quickly to variations in load occurring between the regularly scheduled set signal 122A and reset signal 140A.

Figure 9:
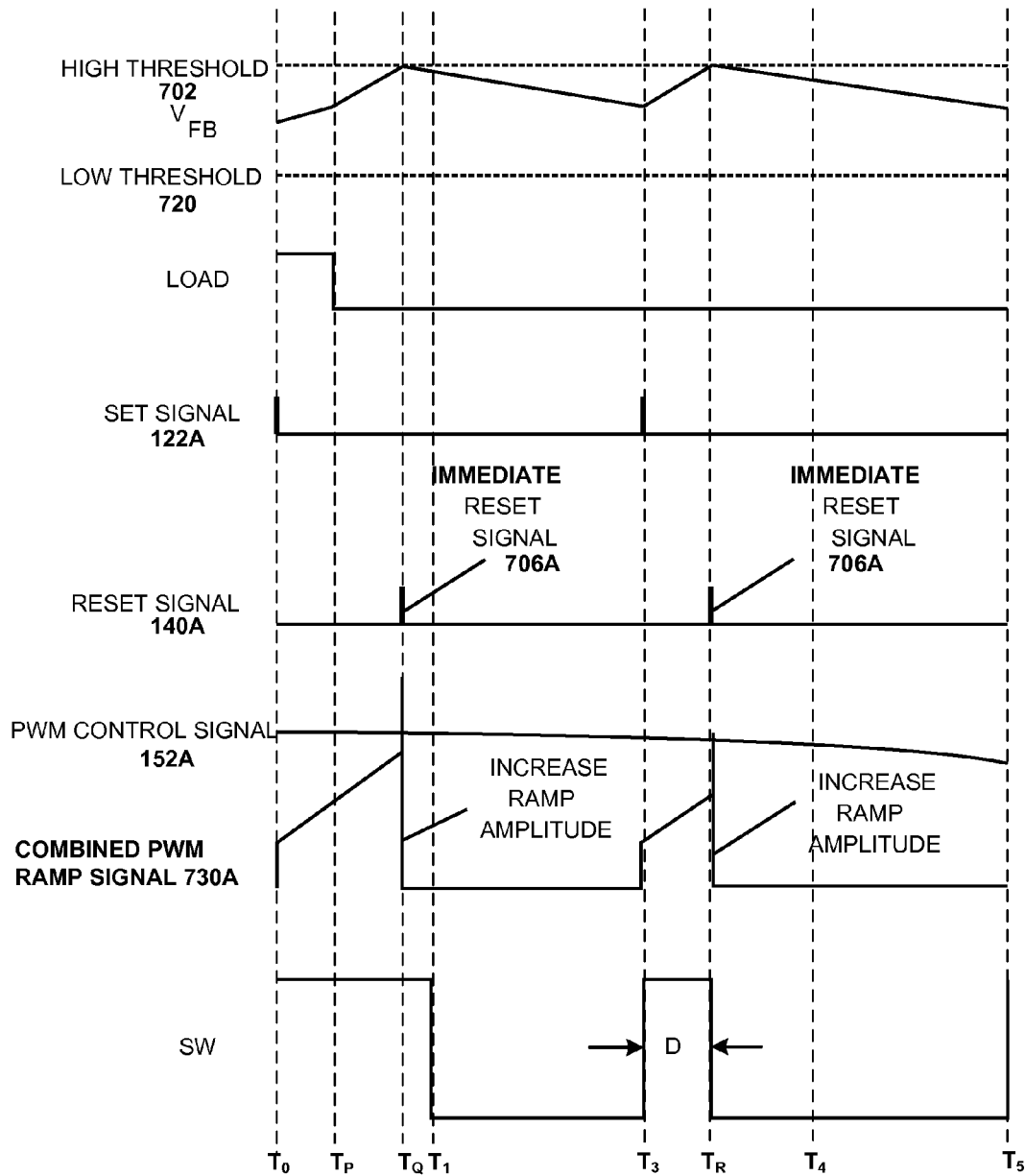
FIG. 9 shows graphs of the various signals as the improved switching regulator circuit operates when load and voltage variations occur between a scheduled reset signal and a scheduled set signal, for implementing embodiments of the present disclosure.

FIG. 9 shows graphs of the various signals as the improved switching regulator circuit 700 operates when load and voltage variations occur between a scheduled reset signal 140A and a scheduled set signal 122A, for implementing embodiments of the present disclosure.

A time Tp, occurs sometime after set signal 122A at time T0 and before reset signal 140A at time T1. At time Tp, the load 502 on the improved switching regulator circuit 700 decreases and the sample voltage $V_{FB}$ is drawn higher due to the decreased load. The decreased load 702 draws the sample voltage $V_{FB}$ higher than the relatively minor variations shown in FIG. 4 until the sample voltage $V_{FB}$ is equal to or greater than the high threshold voltage level 702.

At time Tq, an immediate reset signal 706A is issued. As a result the duty cycle is reduced and the output voltage and the sample voltage $V_{FB}$ are drawn lower. The immediate reset signal 706A provides additional time, from time Tq to time T3 to pull the output voltage Vout lower.

At time T3, the next scheduled set signal 122A is issued and the output voltage Vout and the sample voltage $V_{FB}$ begin to climb. However, the increase pulse width modulation ramp signal 704A is also input to the summation circuit 120 at time Tq. As a result, the duty cycle D is reduced for the improved switching regulator circuit 700 to drive the output voltage Vout higher. When the feedback signal is higher than a high threshold level an immediate reset signal and an increase ramp signal to decrease duty cycle can be immediately issued for at least one cycle until the feedback becomes lower than the high threshold level.

A second immediate reset signal 706A is issued at time Tr, when the sample voltage $V_{FB}$ is again equal to or greater than the high threshold voltage level 702. The next scheduled reset signal 140A was scheduled for time T4 and allowing the increase in the output voltage Vout and the sample voltage $V_{FB}$ to continue until time T4 would have resulted in driving the output voltage excessively high.

Figure 10:
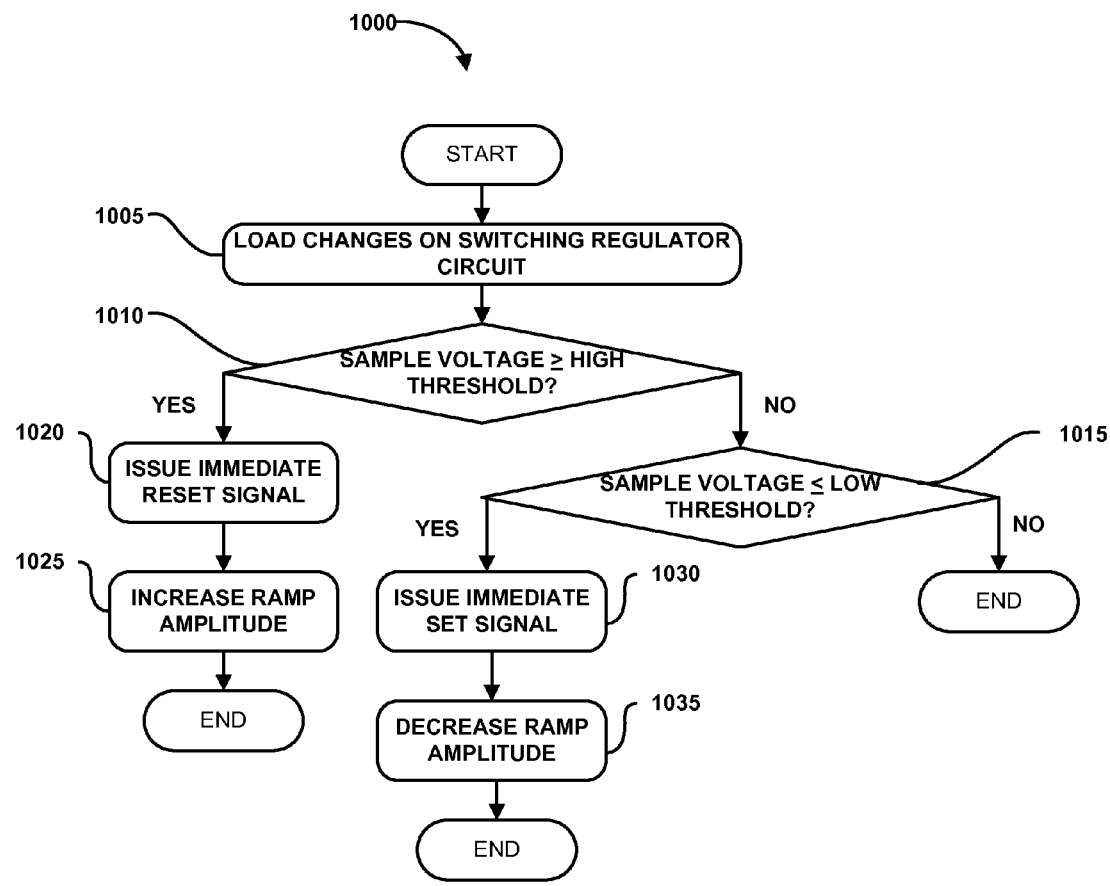
FIG. 10 is a flowchart diagram that illustrates the method operations performed by the improved switching regulator circuit, for implementing embodiments of the present disclosure.

FIG. 10 is a flowchart diagram that illustrates the method operations 1000 performed by the improved switching regulator circuit 700, for implementing embodiments of the present disclosure.

In an operation 1005, the improved switching regulator circuit 700 detects a change in the load. A decrease in the load 502 will result in an increase of the output voltage Vout and the corresponding feedback voltage sample $V_{FB}$. An increase in the load 502 will result in a decrease of the output voltage Vout and the corresponding feedback voltage sample $V_{FB}$.

In an operation 1010, the feedback voltage sample $V_{FB}$ is examined to determine if the feedback voltage sample $V_{FB}$ is equal to or greater than a high threshold voltage. Note the high threshold voltage and be any selected voltage level above a nominal output voltage Vout, where the nominal output voltage is equal to the voltage reference 150.

If the feedback voltage sample $V_{FB}$ is not equal to or greater than the high threshold voltage, the method operations continue in an operation 1015 described below. If the feedback voltage sample $V_{FB}$ is equal to or greater than the high threshold voltage, the method operations continue in an operation 1020.

In operation 1020, an immediate reset signal 706A is issued to reduce the output voltage Vout to a level below the high threshold voltage. In an operation 1025, a ramp amplitude can be increased to decrease the duty cycle and limit the gain in the subsequent amplification cycle, following the next scheduled set signal 122A. The method and operations can then continue in operation 1010 as described above until the output voltage Vout is settled to the nominal output level and the feedback voltage sample $V_{FB}$ is no longer equal to or greater than the high threshold level.

It should be understood that multiple iterations of operations 1010-1025 may be required to bring the output voltage Vout to the nominal output voltage level. It should also be understood that as described above, the normally scheduled set signals 122A and reset signals 140A may also occur during the execution of operations 1010-1025. The method operations can then end.

In operation 1015, the feedback voltage sample $V_{FB}$ is examined to determine if the feedback voltage sample $V_{FB}$ is equal to or less than a low threshold voltage. If the feedback voltage sample $V_{FB}$ is not equal to or less than the low threshold voltage, the method operations can continue in operation 1010 as described above or can end. If the feedback voltage sample $V_{FB}$ is equal to or less than the low threshold voltage, the method operations continue in an operation 1030.

In operation 1030, an immediate set signal 726A is issued to increase the output voltage Vout. In an operation 1035, a ramp amplitude can be decreased to increase the duty cycle and increase the gain in the subsequent amplification cycle, following the next scheduled reset signal 140A. The method and operations can then continue in operation 1010 as described above until the output voltage Vout is settled to the nominal voltage output level and the feedback voltage sample $V_{FB}$ is no longer equal to or less than the low threshold level.

It should be understood that multiple iterations of operations 1010-1035 may be required to bring the output voltage Vout up to the nominal output voltage level. It should also be understood that as described above, the normally scheduled set signals 122A and reset signals 140A may also occur during the execution of operations 1010-1035. The method operations can then end.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive of a computer.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A switching rectifier circuit comprising:
    a voltage input coupled to a positive amplification device and a negative amplification device, the positive amplification device and the negative amplification device coupled in series;
    a voltage output node on a common output of the positive amplification device and the negative amplification device;
    a pulse width modulation controller coupled to the positive amplification device and the negative amplification device, the pulse width modulation controller including a set input and a reset input;
    a voltage switching circuit having a voltage switching circuit output and a clock signal input;
    a pulse width modulation comparator coupled between the voltage switching circuit output and the pulse width modulation controller;
    an error amplifier having an error amplifier output coupled to the pulse width modulation comparator;
    a voltage reference having an output coupled to the error amplifier;
    a high threshold voltage comparator including:
        a high threshold voltage reference;
        a first high threshold voltage comparator input coupled to the high threshold voltage reference;
        a second high threshold voltage comparator input coupled to the output voltage; and
        a high threshold voltage comparator output coupled to the pulse width modulation controller reset input;
    a low threshold voltage comparator including:
        a low threshold voltage reference;
        a first low threshold voltage comparator input coupled to the low threshold voltage reference;
        a second low threshold voltage comparator input coupled to the output voltage; and
        a low threshold voltage comparator output coupled to the pulse width modulation controller set input.

2. The switching rectifier circuit of claim 1, wherein the high threshold voltage comparator further includes an immediate reset pulse generator having an immediate reset pulse generator input coupled to an output of a comparison of the high threshold voltage reference and the feedback voltage divider output.

3. The switching rectifier circuit of claim 1, wherein the low threshold voltage comparator further includes an immediate set pulse generator having an immediate set pulse generator input coupled to an output of a comparison of the low threshold voltage reference and the feedback voltage divider output.

4. The switching rectifier circuit of claim 1, further comprising:
a current switching circuit;
a summation circuit coupled between the voltage switching circuit output and the pulse width modulation comparator, the summation circuit including:
a first summation circuit input coupled to the voltage switching circuit output; and
a second summation circuit input coupled to the current switching circuit.

5. The switching rectifier circuit of claim 4, wherein the summation circuit further includes an increase pulse width modulation ramp input coupled to a comparison of the high threshold voltage reference and the feedback voltage divider output.

6. The switching rectifier circuit of claim 4, wherein the summation circuit further includes a decrease pulse width modulation ramp input coupled to a comparison of the low threshold voltage reference and the feedback voltage divider output.

7. The switching rectifier circuit of claim 1, wherein the pulse width modulation controller includes:
a first pulse width modulation controller output coupled to the positive amplification device;
a second pulse width modulation controller output coupled to the negative amplification device; and
a pulse width modulation controller input.

8. A method of regulating a voltage comprising:
sampling a varying output voltage of the voltage regulator;
comparing the sampled output voltage to a high threshold voltage reference;
decreasing the output voltage of the voltage regulator when the sampled output voltage is equal to or greater than the high threshold voltage reference wherein decreasing the output voltage includes increasing a pulse width modulating ramp signal; and
increasing the output voltage of the voltage regulator when the sampled output voltage is equal to or less than the low threshold voltage reference wherein increasing the output voltage includes decreasing the pulse width modulating ramp signal.

9. The method of claim 8, wherein sampling the output voltage includes dividing the output voltage in a feedback voltage divider.

10. The method of claim 8, wherein increasing the increasing pulse width modulating ramp signal and the decreasing pulse width modulating ramp signal are combined in a summation circuit to modify a pulse width modulation ramp signal to form a combined pulse width modulation ramp signal.

11. The method of claim 8, wherein decreasing the output voltage includes decreasing a duty cycle of the voltage regulator.

12. The method of claim 10, further comprising inputting the combined pulse width modulation ramp signal and a pulse width modulator control signal in a pulse width modulation comparator to produce a control input to the pulse width modulation control.

13. The method of claim 8, wherein increasing the output voltage includes increasing a duty cycle of the voltage regulator.

14. A switching regulator circuit comprising:
a pulse width modulation controller having a high control input and a low control input;
a high threshold voltage comparator circuit having a first output coupled to the high control input, the high threshold voltage comparator circuit configured to compare a high threshold voltage reference and an output voltage of the switching regulator and output a reset signal to the high control input of the pulse width modulation controller when the output voltage is equal to or greater than the high threshold voltage reference wherein the set signal includes increasing a pulse width modulating ramp signal; and
a low threshold voltage comparator circuit having a second output coupled to the low control input, the low threshold voltage comparator circuit configured to compare a low threshold voltage reference and the output voltage and output a set signal to the low control input of the pulse width modulation controller when the output voltage is equal to or less than the low threshold voltage reference wherein the reset signal includes decreasing the pulse width modulating ramp signal.

15. The circuit of claim 14, wherein the high threshold voltage comparator circuit includes an immediate reset pulse generator configured to immediately generate the reset signal when the output voltage is equal to or greater than the high threshold voltage reference.

16. The circuit of claim 15, wherein the pulse width modulation controller is configured to decrease a duty cycle of the switching regulator in response to the output reset signal from the high threshold voltage comparator circuit, independent from a switching frequency of the switching regulator.

17. The circuit of claim 16, wherein decreasing the duty cycle of the switching regulator decreases the output voltage of the switching regulator.

18. The circuit of claim 14, wherein the low threshold voltage comparator circuit includes an immediate set pulse generator configured to immediately generate the set signal when the output voltage is equal to or less than the low threshold voltage reference.

19. The circuit of claim 18, wherein the pulse width modulation controller is configured to increase a duty cycle of the switching regulator in response to the output set signal from the low threshold voltage comparator circuit, independent from the switching frequency of the switching regulator.

20. The circuit of claim 18, wherein increasing the duty cycle of the switching regulator increases the output voltage.

* * * * *